United States Patent Office 2,851,175
Patented Sept. 9, 1958

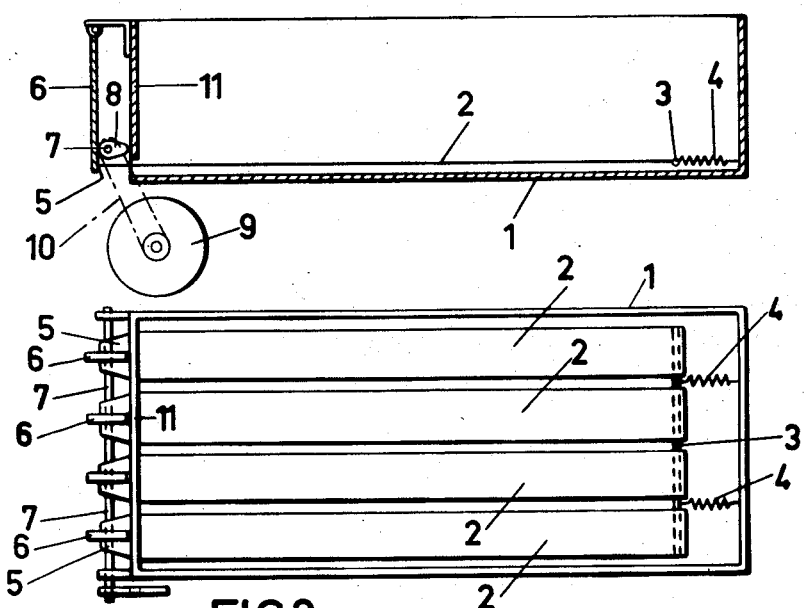
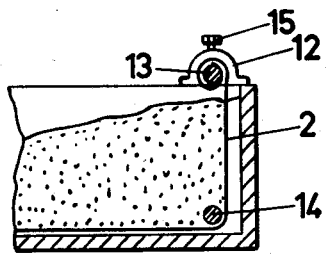

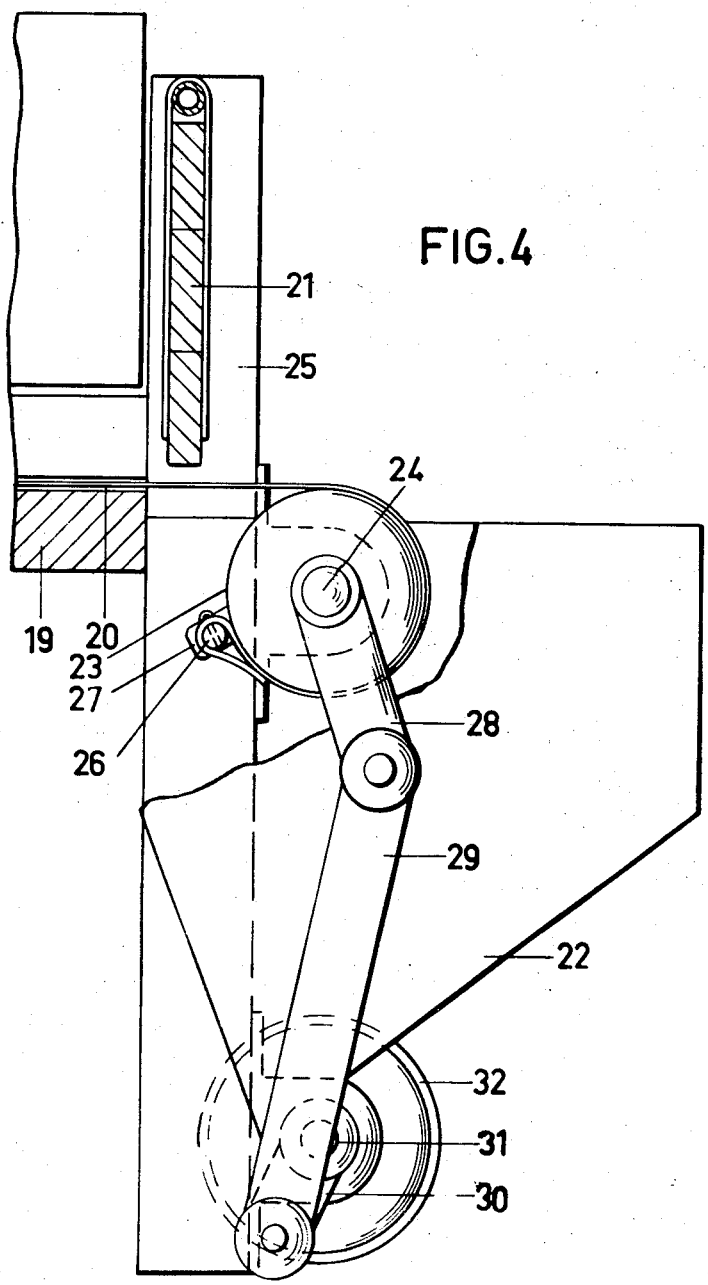

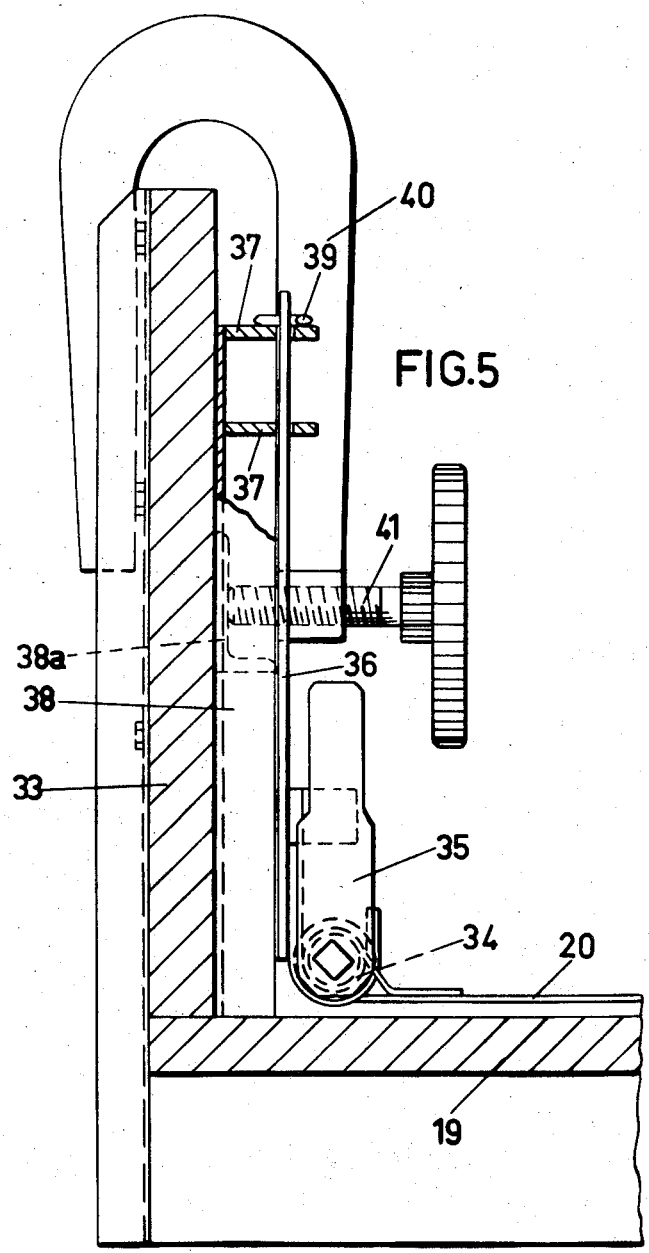

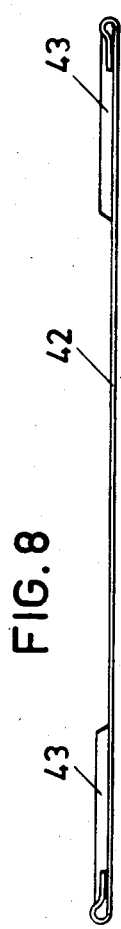
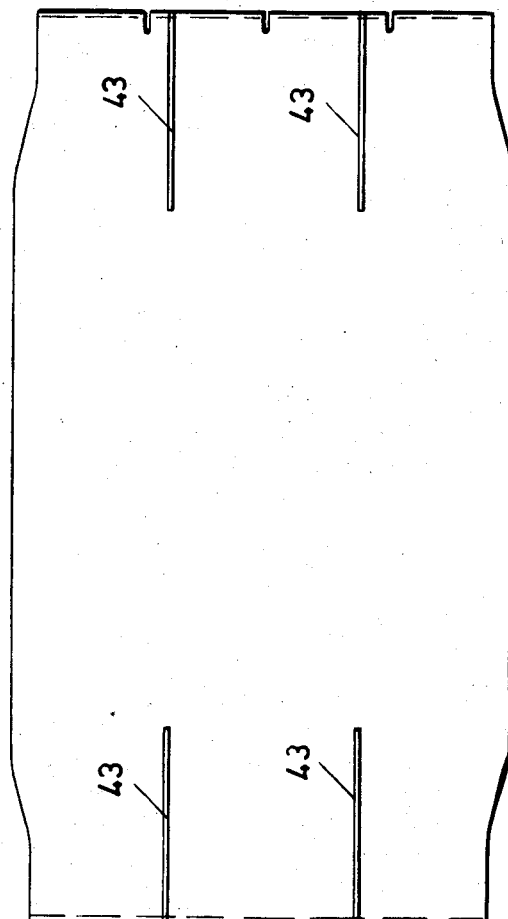
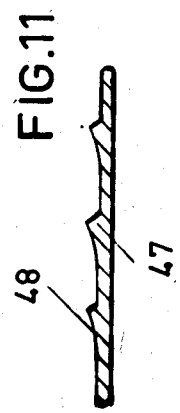
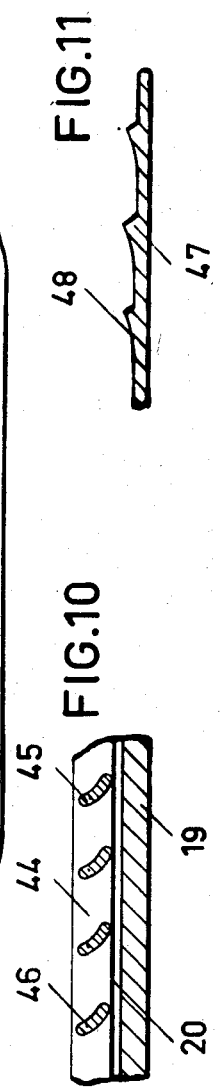

2,851,175
FEED APPARATUSES FOR SPREADING GRANULAR MATERIAL

Gunnar Nilsson, Varmlands-Dalby, Oskar Bredsberg, Torsby, and Bengt Ingemar Karlsson, Stockholm, Sweden, assignors to Trafik- & Vägmärken AB, Stockholm, Sweden, a corporation of Sweden Application January 4, 1957, Serial No. 632,522

Claims priority, application Sweden April 19, 1956

13 Claims. (Cl. 214—83.3)

This invention relates to a feed apparatus for spreading granular material, such as sand for sanding streets, artificial fertilizers on fields, etc.

The feed apparatus according to the invention is characterized by the fact that one or more elastic bands are arranged along the floor of a truck platform and for their actuation subjected to jerks in the longitudinal direction. The invention provides a mechanically particularly simple and reliable feed apparatus.

The invention will be described more in detail in the following, reference being had to the accompanying drawings illustrating some embodiments thereof. In the drawings:

Fig. 1 is a diagrammatic vertical longitudinal section of a feed apparatus according to the invention as mounted on the platform of a truck.

Fig. 2 is a plan view of the apparatus shown in Fig. 1.

Fig. 3 is a vertical section of a modified fastening device.

Fig. 4 shows another embodiment of a jerk mechanism, partly in vertical section and partly in elevation.

Fig. 5 shows another embodiment of a spring means for fastening one or more elastic bands at the front end of the truck platform, in elevation and partly in section.

Fig. 6 is a side view of an elastic band.

Fig. 7 is a side view of another embodiment of the elastic band.

Fig. 8 is a side view of still another embodiment of the elastic band.

Fig. 9 is a plan view of the band as shown in Fig. 8.

Fig. 10 is a vertical longitudinal section of a portion of the floor of the truck platform and the band extending thereabove, including a feed improving mechanism located above said band.

Fig. 11 is a vertical longitudinal section of a still further embodiment of the elastic band.

Figs. 1 and 2 diagrammatically show the platform or body 1 of a truck. A plurality of elastic bands 2, e. g. of rubber, are arranged along the floor of the platform 1. Said bands have their front ends passed onto a rod 3 which is secured to the front end wall of the platform 1 by means of coil springs 4. The rear ends 5 of the elastic bands 2 are connected to jerk mechanisms arranged at the rear end of the platform 1. In the embodiment illustrated, the jerk mechanisms consist of arms 6, the one ends of which are hingedly secured to the rear end wall of the platform, while their other ends are connected to the rear ends of the elastic bands. The arms 6 are swung by cams 8 on a cam shaft 7 mounted at the rear end wall of the platform, when said shaft is rotated by a suitable drive, e. g. from the rear wheels 9 of the truck over a chain transmission 10. At the rotation of the cam shaft 7 the arms 6 will thus alternately make a jerk in the elastic bands, thus expanding them, and permit them elastically to contract. If the platform has a load of granular material, e. g. sand, that part of the sand which is closest to the jerk mechanism will be conveyed towards said mechanism through a slot between the floor and the rear end wall 11 of the platform, falling to the ground over the rear edge of the floor of the truck platform. When the platform is filled with sand the bands are pressed against the floor of the platform, and only the rear portions of the bands are therefore actuated by the jerk mechanism. The border between the inactuated and actuated portions of the bands is moved towards the front end of the platform in the course of the sanding. The spring means 4 located between the front ends of the elastic bands and the front end wall of the platform are actuated only when almost all of the sand originally lying on the platform has been fed from said platform. For regulating the amount of sand fed per unit of time the end wall 11 can be vertically adjustable so that the width of the slot between the end wall and the floor of the platform can be adjusted.

Instead of securing the front ends of the bands 2 to the front end wall of the platform by means of coil springs 4, as is shown in Figs. 1 and 2, it is also possible to use the fastening mechanism shown in Fig. 3. Said mechanism includes on each of the side walls of the platform adjacent to the front end wall of the platform a bearing 12, and in said bearings there is rotatably mounted a shaft 13 to which the front ends of the bands 2 are secured. The bands 2 extend from the shaft 13 vertically downwardly about a shaft 14 rotatably mounted near the floor of the platform in the side walls thereof, and pass from said shaft 14 along the floor of the platform to the jerk mechanism not shown in Fig. 3. The bands 2 can be stretched to the desired extent by a rotation of the shaft 13 so that the bands 2 are wound to a more or less great extent about said shaft, whereafter the shaft is locked in the adjusted position of rotation by means of a setscrew 15 mounted on one of the bearings 12.

Instead of designing the elastic bands with a constant thickness over their entire length, it is sometimes advantageous to employ bands having decreasing thickness from the front end of the platform towards the jerk mechanism at the rear end of the platform. The thickness of the band may decrease continuously, as is shown for band 16 in Fig. 6, or the thickness of the band may decrease stepwise, as is shown for band 17 in Fig. 7. The latter design is of particular advantage, since the vertical steps 18 give a positive engagement with the sand or the like, thus improving the feed.

Instead of a plurality of parallel narrow bands it is possible to employ a single band having substantially the same width as the floor of the platform between the side walls thereof, and this band may of course be designed with a non-uniform thickness in accordance with Figs. 6 and 7.

In the embodiment according to Fig. 4, 19 designates the floor of a platform and 20 an elastic band. Mounted above the band is a swingable shutter 21 for regulating the amount of sand or other granular material fed by said band 20 to a discharge hopper 22. In the illustrated position of the mechanism, the band 20 extends approximately three quarters of a turn about a roller 23 which is rotatably mounted by means of a shaft 24 on a frame 25 removable from the truck platform and carrying the shutter 21 and the discharge hopper 22. The band end is bent to a loop in which a tube 26 is introduced, which is secured to lugs 27 on the roller 23. Non-rotatably mounted on the shaft 24 is an arm 28 which at its free end is hingedly connected to one end of a connecting rod 29, the other end of which is hingedly connected to a crank 30. Said crank is secured to a shaft 31 which is mounted on the frame 25 and provided with a drive wheel 32. Said drive wheel can be rotated by means of a drive (not shown), e. g. by means of a chain drive connected to the rear wheels of the truck. When the shaft 31 is rotated, the crank mechanism 28—30 will rotate the shaft 23 to and fro so that the band 20 is alternatingly wound to a more or less great extent about the roller 23 while the band 20 is elastically expanded and slackened in the manner described above for feeding sand to the discharge hopper 22. Instead of a cylindrical roller 23 it is of course possible to employ a cylinder segment, or to give the surface of the roller means coming into contact with the band 20 another cross-sectional shape than an arc of circle.

In Fig. 5 the floor of the truck platform is designated 19 and the front end wall of the platform 33. The front end of the band 20 remote from the jerk mechanism is formed into a loop through which a tube 34 extends. Secured to this tube are fastening means 35 (only one is shown) by means of which the front end of the band 20 is fixed to the lower end of one or more upwardly directed leaf springs 36. The upper ends of the leaf springs pass through holes in two lugs 37 on a frame 38 and are held in a suitable height position by means of a cotter pin 39. The frame 38 is removably clamped to the end wall 33 by means of one or more screw clamps consisting of a U-shaped member 40 grasping the end wall 33, and a tightening screw 41 which can be pressed against a transverse rod 38a of the frame 38.

Figs. 8 and 9 show an elastic band 42 which is to extend substantially across the entire floor surface of a truck platform. Said band 42 has its ends provided with longitudinally directed strips 43 which project from the upper side of the band and guide the sand or like material. Said strips 43 improve the distribution of the sand over the band width during the feed. In the embodiment illustrated the strips 43 have been formed by slitting the respective band end and interconnecting the upwardly bent, moved-together slot edge portions. If desired, it is of course possible to arrange such guide strips 43 only at one end of the band, preferably at the band end connected to the jerk mechanism.

Fig. 10 shows a portion of the floor 19 of the truck platform and the band 20 located thereabove. Along the side walls of the platform there are provided bearing means 44 in which pivots 45 at the upper longitudinal edge of rails or vanes 46 are mounted so that the rails 46 can swing about their upper edge. The lower edge of the rails 46 is supported on the band 20 in such a way that the rails are inclined obliquely downwardly towards the band 20, with the lower edge located closest to the end of the band 20 connected to the jerk mechanism. At a jerk in the band 20 effected by the jerk mechanism the rails 46 are swung aside counterclockwise, as seen in Fig. 10, from the sand fed by the band 20 towards the jerk mechanism (to the right in Fig. 10) but prevent the sand from moving back together with the band 20 during the return thereof to the left as seen in Fig. 10, inasmuch as the rails 46 are then swung clockwise by the sand into engagement with the band 20.

An improvement of the feed of the sand or a granular material to propel the same towards the jerk mechanism can also be attained by providing the elastic band with elevated portions extending transversely of the band. Such an embodiment is shown in Fig. 11 where the band 47 on its upper side is provided with transverse elevated portions 48 which, as seen in cross section, are in the shape of saw teeth having their steep flanks facing the jerk mechanism (to the right in Fig. 11).

What we claim and desire to secure by Letters Patent is:

1. A feed apparatus for spreading granular material from the floor of a truck body, comprising elastic band means extending along said floor so as to be pressed into frictional contact with said floor by a heap of granular material resting on said band means, mounting means connecting one end of said band means with the truck body, and a jerk mechanism connected to the other end of said band means adjacent an edge of said floor and alternatingly expanding a portion of said band means in its longitudinal direction and allowing said portion to contract, said portion of said band means comprising the portion thereof extending from said other end to the adjacent end of said heap and including an adjacent portion only of said band means under said heap, whereby granular material from the end of the heap adjacent said other end of said band means is transported by said band means towards said other end of said band means.

2. A feed apparatus for spreading granular material from the floor of a truck body, comprising elastic band means extending along said floor so as to be pressed into frictional contact with said floor by a heap of granular material resting on said band means, spring means connecting one end of said band means with the truck body, and a jerk mechanism connected to the other end of said band means adjacent an edge of said floor and alternatingly expanding a portion of said band means in its longitudinal direction and allowing said portion to contract, said portion of said band means comprising the portion thereof extending from said other end to the adjacent end of said heap and including an adjacent portion only of said band means under said heap, whereby granular material from the end of the heap adjacent said other end of said band means is transported by said band means towards said other end of said band means.

3. A feed apparatus for spreading granular material from the floor of a truck body, comprising elastic band means extending along said floor so as to be pressed into frictional contact with said floor by a heap of granular material resting on said band means, leaf spring means connected at one end to one end of said band means, anchoring means connecting the other end of said leaf spring means with the truck body, said leaf spring means extending at an angle to said band means between said one end of said band means and said anchoring means, and a jerk mechanism connected to the other end of said band means adjacent an edge of said floor and alternatingly expanding a portion of said band means in its longitudinal direction and allowing said portion to contract, said portion of said band means comprising the portion thereof extending from said other end to the adjacent end of said heap and including an adjacent portion only of said band means under said heap, whereby granular material from the end of the heap adjacent said other end of said band means is transported by said band means towards said other end of said band means.

4. A feed apparatus for spreading granular material from the floor of a truck body, comprising elastic band means extending along said floor so as to be pressed into frictional contact with said floor by a heap of granular material resting on said band means, a roller rotatably mounted on the truck body adjacent the floor thereof, a stretching device mounted on the truck body above said roller, one end of said band means passing around said roller upwardly and being attached to said stretching device, and a jerk mechanism connected to the other end of said band means adjacent an edge of said floor and alternatingly expanding a portion of said band means in its longitudinal direction and allowing said portion to contract, said portion of said band means comprising the portion thereof extending from said other end to the adjacent end of said heap and including an adjacent portion only of said band means under said heap, whereby granular material from the end of the heap adjacent said other end of said band means is transported by said band means towards said other end of said band means.

5. A feed apparatus for spreading granular material from the floor of a truck body, comprising elastic band means extending along said floor so as to be pressed into frictional contact with said floor by a heap of granular material resting on said band means, mounting means connecting one end of said band means with the truck body, bearing means on the truck body, actuating arm means connected to the other end of said band means, said actuating arm means being pivotally mounted in said bearing means and extending from said bearing means at an angle to said band means, and operating means swinging said actuating arm means to and fro for alternatingly expanding a portion of said band means in its longitudinal direction and allowing said portion to contract suddenly, said portion of said band means comprising the portion thereof extending from said other end to the adjacent end of said heap and including an adjacent portion only of said band means under said heap, whereby granular material from the end of the heap adjacent said other end of said band means is transported by said band means towards said other end of said band means.

6. A feed apparatus for spreading granular material from the floor of a truck body, comprising elastic band means extending along said floor so as to be pressed into frictional contact with said floor by a heap of granular material resting on said band means, mounting means connecting one end of said band means with the truck body, bearing means on the truck body, roller means rotatably mounted in said bearing means, the other end of said band means being connected with said roller means, a drive mechanism oscillating said roller means in said bearing means for alternately winding said other end of said band means about said roller means to a more and less extent in order to alternatingly expand a portion of said band means in its longitudinal direction and allow said portion to contract, said portion of said band means comprising the portion thereof extending from said other end to the adjacent end of said heap and including an adjacent portion only of said band means under said heap, whereby granular material from the end of the heap adjacent said other end of said band means is transported by said band means towards said other end of said band means.

7. A feed apparatus according to claim 6 in which said drive mechanism comprises a rotatable crank and a connecting rod, one end of said connecting rod being connected with said crank and the other end of said connecting rod being connected with said roller means at a distance from the axis of rotation thereof.

8. A feed apparatus for spreading granular material from the floor of a truck body, comprising elastic band means extending along said floor so as to be pressed into frictional contact with said floor by a heap of granular material resting on said band means, mounting means connecting one end of said band means with the truck body, a jerk mechanism connected to the other end of said band means adjacent an edge of said floor and alternatingly expanding a portion of said band means in its longitudinal direction and allowing said portion to contract, said portion of said band means comprising the portion thereof extending from said other end to the adjacent end of said heap and including an adjacent portion only of said band means under said heap, whereby granular material from the end of the heap adjacent said other end of said band means is transported by said band means towards said other end of said band means, and a plurality of longitudinally spaced pivoted obstructing means disposed transversely above said band means and permitting transport of granular material by said band means towards said other end of said band means but obstructing movement of granular material in the opposite direction.

9. A feed apparatus according to claim 8 in which said pivoted obstructing means comprise a plurality of longitudinally spaced inclined vanes extending transversely of the longitudinal direction of said band means, and mounting means for said vanes on the truck body, said vanes being pivotally mounted by means of said mounting means adjacent their upper edges and being inclined downwardly toward said other end of said band means with their lower edges normally engaged with said band means.

10. A feed apparatus for spreading granular material from the floor of a truck body, comprising elastic band means extending along said floor so as to be pressed into frictional contact with said floor by a heap of granular material resting on said band means, mounting means connecting one end of said band means with the truck body, and a jerk mechanism connected to the other end of said band means adjacent an edge of said floor and alternatingly expanding a portion of said band means in its longitudinal direction and allowing said portion to contract, said portion of said band means comprising the portion thereof extending from said other end to the adjacent end of said heap and including an adjacent portion only of said band means under said heap, whereby granular material from the end of the heap adjacent said other end of said band means is transported by said band means towards said other end of said band means, said band means decreasing in thickness from said one end towards said other end thereof.

11. A feed apparatus according to claim 10 in which said band means decreases stepwise in thickness from said one end towards said other end thereof.

12. A feed apparatus for spreading granular material from the floor of a truck body, comprising elastic band means extending along said floor so as to be pressed into frictional contact with said floor by a heap of granular material resting on said band means, mounting means connecting one end of said band means with the truck body, a jerk mechanism connected to the other end of said band means adjacent an edge of the floor of the truck platform and alternatingly expanding a portion of said band means in its longitudinal direction and allowing said portion to contract, said portion of said band means comprising the portion thereof extending from said other end to the adjacent end of said heap and including an adjacent portion only of said band means under said heap, whereby granular material from the end of the heap adjacent said other end of said band means is transported by said band means towards said other end of said band means, and elevated longitudinally extending portions on the upper surface of said band means for guiding the granular material transported by said band means.

13. A feed apparatus for spreading granular material from the floor of a truck body, comprising elastic band means extending along said floor so as to be pressed into frictional contact with said floor by a heap of granular material resting on said band means, mounting means connecting one end of said band means with the truck body, a jerk mechanism connected to the other end of said band means adjacent an edge of said floor and alternatingly expanding a portion of said band means in its longitudinal direction and allowing said portion to contract, said portion of said band means comprising the portion thereof extending from said other end to the adjacent end of said heap and including an adjacent portion only of said band means under said heap, whereby granular material from the end of the heap adjacent said other end of said band means is transported by said band means towards said other end of said band means, and elevated portions on the upper surface of said band means extending transversely of said band means and having in cross section the shape of saw teeth, the steep flanks of said elevated portions facing said other end of said band means.

References Cited in the file of this patent

UNITED STATES PATENTS

| 513,940 | Kelly | Jan. 30, 1894 |
| 1,234,495 | Sargent | July 24, 1917 |
| 1,428,036 | Johnson | Sept. 5, 1922 |
| 2,629,504 | Peterson | Feb. 24, 1953 |

FOREIGN PATENTS

| 197,687 | Great Britain | June 12, 1924 |